United States Patent
Wool et al.

(10) Patent No.: US 6,900,261 B2
(45) Date of Patent: May 31, 2005

(54) SHEET MOLDING COMPOUND RESINS FROM PLANT OILS

(75) Inventors: Richard P. Wool, Newark, DE (US); Jue Lu, Newark, DE (US); Shrikant N. Khot, Breinigsville, PA (US)

(73) Assignee: The University of Delaware, Newark, DE (US)

(*) Notice: Subject to any disclaimer, the term of this patent is extended or adjusted under 35 U.S.C. 154(b) by 160 days.

(21) Appl. No.: 10/166,849

(22) Filed: Jun. 11, 2002

(65) Prior Publication Data

US 2003/0088007 A1 May 8, 2003

Related U.S. Application Data

(60) Provisional application No. 60/297,475, filed on Jun. 12, 2001.

(51) Int. Cl.⁷ .................................................. C08K 3/18
(52) U.S. Cl. ........................... 524/430; 524/10; 524/11; 524/12; 524/433; 524/313; 524/318
(58) Field of Search .......................... 525/49, 451, 523, 525/529, 530; 528/393, 365, 366, 403, 405, 486, 392, 272; 524/109, 430, 10, 11, 12, 13

(56) References Cited

U.S. PATENT DOCUMENTS

| | | | |
|---|---|---|---|
| 3,879,318 A | 4/1975 | Forsyth | 260/16 |
| 3,997,627 A * | 12/1976 | Ichimura et al. | 526/320 |
| 4,101,475 A | 7/1978 | Stalego | 260/21 |
| 4,144,305 A | 3/1979 | Cottrell, Jr. et al. | 264/247 |
| 4,210,571 A | 7/1980 | Herman | 260/40 R |
| 4,210,572 A | 7/1980 | Herman et al. | 260/40 R |
| 4,245,059 A | 1/1981 | Ichimura et al. | 525/170 |
| 4,367,192 A | 1/1983 | Arnason | 264/255 |
| 4,408,000 A | 10/1983 | Lee | 524/315 |
| 4,409,351 A | 10/1983 | Lee | 524/322 |
| 4,444,921 A | 4/1984 | South, Jr. | 523/200 |
| 5,100,935 A | 3/1992 | Iseler et al. | 523/514 |
| 5,114,756 A | 5/1992 | Mirabeau et al. | 427/379 |
| 5,200,446 A | 4/1993 | Bergner | 524/173 |
| 5,268,400 A | 12/1993 | Iseler et al. | 523/514 |
| 5,504,151 A | 4/1996 | Fisher et al. | 525/49 |
| 5,576,409 A | 11/1996 | Mackey | 528/49 |
| 5,744,816 A | 4/1998 | Butler | 252/182.18 |
| 5,883,166 A | 3/1999 | Jennings et al. | 524/186 |
| 6,121,398 A * | 9/2000 | Wool et al. | 526/238.1 |
| 6,222,005 B1 * | 4/2001 | Loza et al. | 528/295.5 |

* cited by examiner

*Primary Examiner*—Katarzyna Wyrozebski
(74) *Attorney, Agent, or Firm*—Connolly Bove Lodge & Hutz LLP

(57) ABSTRACT

This invention is directed to the preparation of a molded compound. The molded compound is made by the process which contains the steps of (1) mixing
   a. an unsaturated polymer resin which has been synthesized from a natural triglyceride oil containing an effective amount of acid groups in order to thicken with metal ions
   b. a polymerizable monomer,
   c. a thickening agent to form a polymerizable material,
(2) polymerizing said polymerizable material in a mold to form a molded compound. The invention further relates to a molded compound.

41 Claims, No Drawings

SHEET MOLDING COMPOUND RESINS FROM PLANT OILS

RELATED APPLICATIONS

This application claims benefit to U.S. Provisional application No. 60/297,475 filed Jun. 12, 2001 which is incorporated by reference in its entirety for all useful purposes.

FIELD OF THE INVENTION

This invention is directed to the preparation of novel thermoset resins from plant oils which are suitable for the manufacture of Sheet Molding Compound (SMC) and Bulk Molding Compound (BMC). Triglycerides, the main components of plant oil, can be suitably functionalized to contain ethylenic unsaturation, hydroxyl groups and carboxylic acid functionality. The carboxylic acid and hydroxyl groups provide thickening with divalent metal ions or divalent monomers such as diisocyanates, while the unsaturated polyester oligomers can be crosslinked by copolymerization to give the fully cured composite in the mold. Prior to thickening, the oligomers are mixed with copolymerizable monomers, free radical initiators, catalysts, low profile additives, other additives and particulate fillers to form the SMC or BMC paste. The paste can be combined with chopped fibers to form a sheet or BMC which is aged until the viscosity reaches a thickening limit. The SMC or BMC materials are then molded and cured to make the composite part.

BACKGROUND OF THE INVENTION

Sheet Molding Compound (SMC) and Bulk Molding Compound (BMC) are used frequently in the production of composite materials for use in the automotive, trucking agricultural equipment ("ag-equipment"), construction, electronics, aircraft and military industries. The molding compound contains a mixture of fibers, fillers, additives, and a liquid molding resin. These compounds are generally categorized as Bulk Molding Compound (BMC) or Sheet Molding Compound (SMC) depending on their compositions. SMC's usually contain higher amounts of reinforcing fiber than BMC. Manufacturing composite parts using these compounds is popular because of their ability to produce low cost parts with a wide range of properties. Additionally, they have the ability to overcome many of the difficulties encountered in composites manufacturing, such as shrinkage and surface defects, which are especially important in the automotive and ag-equipment areas, where surface finish is an important esthetic of the product.

The production of composite parts from Sheet Molding Compounds takes place in two separate steps, namely, compounding and molding. The compounding step involves the actual production of the "sheet" by blending the liquid molding resin, and optional fillers and additives into a paste, casting the paste onto a carrier film, and optionally depositing the chopped reinforcing fibers into the paste in order to reinforce the sheet, and then sandwiching the mixture with another layer of carrier film. These sheets are then allowed to age in a controlled environment for a predetermined amount of time. During this time, the thickening agents in the paste cause the viscosity of the paste to increase to a level suitable for easy handling and the molding step. The compound formulations, include but are not limited to, divalent cation complexation with carboxyl groups, chain telemerization via unreacted epoxide groups on the triglycerides reacting with di-acids, anhydrides, diamines or di-isocyanates. At this point, the "B-staged" sheet becomes leathery in consistency and is easy to handle in high volume manufacturing operations. In the next manufacturing step, the sheet is cut into a suitable sized piece and placed into a compression mold. The mold is heated, causing some of the labile bonds of the B-Staged resin to weaken, enhancing the flow in the mold and activating chemical initiators within the SMC, thereby causing a cross-linking polymerization reaction. The cure reaction solidifies the molding compound and forms a thermoset composite part.

Liquid molding resins used in SMC are usually prepared by first synthesizing a low molecular weight polymer having the functional groups required for the cross-linking reaction. A reactive diluent is also usually added with the necessary chemical functionality to take part in the cross-linking reaction. If the cross-linking reaction is of the free radical addition type, the required functional group on the polymer is ethylenic unsaturation and the reactive diluent is also an ethylenically unsaturated compound such as, but not limited to, styrene, α-methyl styrene, divinyl benzene, and methyl methacrylate. The relative ratios of unsaturated groups on the polymer and the amount of the reactive diluent are important parameters that those knowledgeable in the field have learned to optimize.

Based on the type of functional group that takes part in the cross-linking reaction, particular types of catalysts and accelerators are also included in the resin which begin and facilitate the cross-linking reaction. If the cross-linking reaction is of the addition type, accelerators such as, but not limited to cobalt naphtenate, cobalt octoate, aromatic tertiary amines, and free radical initiators such as, but not limited to, methyl ethyl ketone peroxide, benzoyl peroxide, cumyl hydroperoxide, and t-butyl peroxybenzoate are added. The choice of initiators and accelerators depends on the reactivity of the polymer and the temperature and the time desired for the cure reaction. The choice of accelerators and initiators are well documented in the literature and are well known by those of ordinary skill in the art.

Commercially available liquid molding resins such as, but not limited to unsaturated polyesters, vinyl esters and epoxy resins are all synthesized using raw materials derived ultimately from petroleum. These include, but are not limited to di-acids and diols, among others, maleic anhydride, phthalic acid, isophthalic acid, aliphatic diols, bisphenol-A, acrylic and methacrylic acid, aliphatic and aromatic diamines, ethylene glycol, propylene glycol and other diols, all of which are petroleum derivatives. Replacing some, or all, of these petroleum derived raw materials with renewable plant-based raw materials is attractive, both economically and socially, as such raw materials are cheaper and their use contributes to global sustainability by not depleting scarce resources of petroleum.

The use of plant-based raw materials such as plant oils is further useful as such naturally occurring compounds are usually consumed readily by microorganisms. In fact, plant triglycerides are readily hydrolyzed in vivo by lipase secreting bacteria. Some chemically functionalized plant oils when reacted to form thermosets are biodegradable while others are not. This presents a novel method for adding and controlling biodegradability in the composite parts formed from these molding compounds. This aspect of these polymers is an additional advantage over polymers derived solely from petroleum based raw materials, very few of which are degradable by naturally occurring bacteria.

It is the intention of the present invention to use resins derived from these plant oils as components in a Sheet Molding Compound. By optionally blending these novel resins with fillers, additives, and reinforcing fiber, Sheet Molding Compounds can be produced which form materials with properties comparable to those produced from petroleum based Sheet Molding Compounds.

In the past, triglycerides and their fatty acid derivatives have been used only in the molding compound field as nothing more than additives. Much of their use has been as components of internal mold release agents. U.S. Pat. Nos. 4,408,000, 4,409,351, 5,576,409, 5,883,166, and 5,744,816 address the use of fatty acids and fatty acid amides as components in a mold releasing agent. The salts of fatty acids have also found use in mold releasing agents as presented in U.S. Pat. No. 4,144,305.

Triglycerides and their fatty acid derivatives have also found much use in coatings for SMC parts. U.S. Pat. No. 5,504,151 presents a surface quality enhancer composed of a polycapped oligomer adduct of a long chain fatty acid and a polyester polyol, which improves the efficiency of thermoplastic low profile additives. U.S. Pat. No. 4,367,192 mentions the use of epoxidized fatty acids to produce vinyl ester components for use in SMC coatings. Similarly, U.S. Pat. No. 4,245,059 presents a coating material for molding compounds where the coating is prepared by condensation of a polyol with a polybasic acid using a modifier such as linseed oil, soybean oil, as well as numerous other oils and fatty acid derivatives. U.S. Pat. No. 5,114,756 presents a conductive epoxypolyamide coating for SMC, formed by reaction of thermally polymerized fatty acids and a polyalkylene polyamine.

Fatty acids and their derivatives have also been used to modify or improve the properties of various Sheet Molding Compounds. U.S. Pat. No. 5,200,446 presents a plastic molding compound treated with an antistatic agent containing fatty acid esters or ethanolamides, mono- or di-glycerides or ethoxylated fatty amines. U.S. Pat. No. 4,101,475 covers a scratch and flame resistant Sheet Molding Compound in which one additive is the salt of fatty acids. Additionally, fatty acid amides have been used to aid in the thickening of Sheet Molding Compounds as presented in U.S. Pat. No. 3,879,318. In U.S. Pat. No. 4,444,921 a thermosettable composition suitable for preparing reinforced plastic articles is produced using a calcium carbonate filler coated with a fatty acid or fatty acid metal salt. Similarly, U.S. Pat. Nos. 4,210,572 and 4,210,571 present the use of fatty acids esters and hydroxy fatty acid esters as coupling agents for fillers in Sheet Molding Compounds. U.S. Pat. Nos. 5,268,400, and 5,100,935 present a Sheet Molding Compound containing various fatty acids as phase stabilizing agents in an unsaturated polyester Sheet Molding Compound.

Amongst all of the aforementioned work, the triglyceride and fatty acid derivatives were used only as additives to either aid in the processing of the Sheet Molding Compound or modify the properties of the end product. This invention differs in that the triglycerides and their fatty acid residues are used to form both the main polymer matrix and the thickening mechanism, roles conventionally taken by petroleum derived polyester, epoxy, and vinyl ester resins.

SUMMARY OF THE INVENTION

The object of this invention is to present thermoset resins derived mostly from natural triglycerides, such as plant and animal oil triglycerides which are suitably used for SMC. The plant based resins are capable of thickening to form sheets which flow when the temperature is raised and react at suitable temperature to form rigid thermosetting polymers. These resins are produced by functionalizing the triglycerides with chemical groups which are necessary for polymerization reactions and the thickening process. Upon functionalizing the triglyceride, it is converted to a monomer capable of polymerizing in the same manner as the conventional polyester, epoxy, and vinyl ester resins.

The invention relates to a process to produce a molded compound which comprises
(1) mixing
   (A) an unsaturated polymer resin which has been synthesized from a natural triglyceride oil containing an effective amount of acid groups in order to thicken with metal ions
   (B) a polymerizable monomer,
   (C) a thickening agent to form a polymerizable material,
(2) polymerizing said polymerizable material in a mold to form a molded compound.

The invention further relates to a molded composition which consists essentially of
   a. an unsaturated polyester resin based which has been synthesized from a predominately natural triglyceride oil containing an effective amount of acid groups in order to thicken with metal ions,
   b. a polymerizable monomer and
   c. a thickening agent.

The triglyceride molecular structure is a combination of various triesters of fatty acids linked together with glycerol. The fatty acid residues are linear carboxylic acids containing from about 4 to about 30 carbon atoms, preferably from about 14 to about 22 carbons and from about zero to about 4, or preferably from about 2 to 3 carbon-carbon double bonds. The types of triglycerides and fatty acid derivatives suitable for use in this invention are those derived from sources such as, but not limited to blends of those shown in Table 1, soybean oil, linseed oil, rapeseed oil, cottonseed oil, corn oil, rapeseed oil, palm oil, fish oil, canola oil, sunflower oil, safflower oil, peanut oil and genetically engineered soybean oils. The oils shown in Table 1 can have their fatty acid distribution function controlled or altered by several processes which include, but are not limited to, (a) genetic engineering, (b) hydrogenation, (c) blending of different oils, (d) transesterification and (e) oil refining, e.g. by winterization.

Triglycerides, the main components of plant oil, can be suitably functionalized to contain ethylenic unsaturation, hydroxyl groups and carboxylic acid functionality. The carboxylic acid and hydroxyl groups provide thickening with divalent metal ions or divalent monomers such as diisocyanates, while the unsaturated polyester oligomers can be crosslinked by copolymerization to give the fully cured composite in the mold. Prior to thickening, the oligomers can be mixed with copolymerizable monomers, free radical initiators, catalysts, low profile additives, other additives and particulate fillers to form the SMC or BMC paste. The paste is then combined with chopped fibers to form a sheet or BMC which is aged until the viscosity reaches a thickening limit. The SMC or BMC materials are then molded and cured to make the composite part.

This invention prescribes the use of liquid molding resins derived from unsaturated triglycerides for use in Sheet Molding and Bulk Molding Compounds. As a result of the chemical functionality of these molecules, they are capable of being converted to monomers suitable for liquid resins that have been shown successful at producing polymers and composites in resin molding processes. (Wool et al, U.S. Pat.

No. 6,121,398, High Modulus Polymers and Composites from Plant Oils). We have invented Sheet Molding and Bulk Molding Compound formulations.

DETAILED DESCRIPTION OF THE INVENTION

We have developed new monomers derived from triglycerides which are capable of both (reversible) thickening and curing reactions. These monomers have been synthesized by the addition of at least 2 ethylenically unsaturated functionalities to the intact triglyceride. These functionalities are added via the double bond functionalities inherent in all unsaturated triglycerides. Examples of such triglycerides are those found in soybean oil, linseed oil, rapeseed oil, cottonseed oil, corn oil, rapeseed oil, palm oil, fish oil, canola oil, sunflower oil, safflower oil, and peanut oil (Table 1).

molding to permit flow and joining in the mold and the subsequent curing of the ethylinic unsaturation to produce a highly crosslinked structurally strong SMC composite material.

Alternatively, a hydroxy functionalized triglyceride can be used as an intermediate to form both the ethylenically unsaturated monomer and the carboxylic acid functionality for complexing with metal oxides. Hydroxyl containing triglycerides can be found naturally as in the case of castor oil, by modification of a plants fatty acid distribution function through genetic engineering, or, can be synthesized via a hydroxylation reaction of unsaturated triglycerides. This hydroxylation process is disclosed in U.S. Pat. No. 6,121,398, High Modulus Polymers and Composites from Plant Oils, by Wool et al. which is incorporated by reference in its entirety for all useful purposes. The hydroxylated triglyceride can then be functionalized then with an unsaturated

TABLE 1

Composition of Natural Fats and Oils

| Oil | C/C=C | Canola | Corn | Linseed | Olive | Palm | Peanut | Safflower | Soy | Lard | Fish |
|---|---|---|---|---|---|---|---|---|---|---|---|
| Lauric | 12:0 | | | | | 0.1 | | | | 0.3 | |
| Myristic | 14:0 | 0.1 | | | | 1.2 | | 0.1 | 0.1 | 1.7 | 1.3 |
| Palmitic | 16:0 | 4.1 | 11.5 | 5.5 | 16.9 | 46.8 | 11.0 | 6.7 | 10.5 | 26.2 | 13.6 |
| Stearic | 18:0 | 1.8 | 2.2 | 3.5 | 2.7 | 3.8 | 2.3 | 2.7 | 3.2 | 13.5 | 1.4 |
| Oleic | 18:1 | 60.9 | 26.6 | 19.1 | 61.9 | 37.6 | 51.0 | 12.9 | 22.3 | 42.9 | 23.5 |
| Linoleic | 18:2 | 21.0 | 58.7 | 15.3 | 14.8 | 10.0 | 30.9 | 77.5 | 54.5 | 9.0 | 0.8 |
| Linolenic | 18:3 | 8.8 | 0.8 | 56.6 | 0.6 | | | | 8.3 | 0.3 | |
| Eicosanoic | 20:0 | | 0.2 | | 0.4 | 0.2 | 0.7 | 0.5 | 0.2 | 0.2 | |
| cis-11-Eicosanoic | 20:1 | | | | 0.1 | 0.3 | | 0.5 | 0.9 | 0.8 | |

An example of two general methods for introducing the ethylenically unsaturated functionalities onto the triglyceride are (1) the reaction of an ethylenically unsaturated carboxylic acid with an epoxidized form of the triglyceride (See FIG. 1, Paths 1, 2, 3, 4 and 5 of U.S. Pat. No. 6,121,398 which is incorporated by reference in its entirety), and (2) the reaction of an unsaturated anhydride with a hydroxylated form of the triglyceride (FIG. 1, Paths 1, 4, 6, 7, 9 and 10 of U.S. Pat. No. 6,121,398 which is incorporated by reference in its entirety). The former technique utilizes an epoxy functional triglyceride as an intermediate. Such triglycerides can be found naturally as in the case of vernonia oil, or can be synthesized via an epoxidation reaction of unsaturated triglycerides. Reaction of the epoxy functional with a number of ethylenically unsaturated carboxylic acids renders it polymerizable via addition polymerization. Examples of such acids are acrylic acid, methacrylic acid, and ethacrylic acid. The extent of acrylation desired is dependent on the type of reaction required to increase the viscosity of the molding compound to its B-stage state. If newly formed hydroxyls are required for the thickening reaction, then complete acrylation is acceptable.

However, if unreacted epoxy rings are to be used for the thickening reaction, then only partial acrylation is desired. The acrylated triglyceride, now has newly formed hydroxyl and residual epoxy groups. Both of them are used to add carboxylic acid functionality with reactive difunctional molecules including, but not limited to, maleic anhydride, maleic acid, phthalic anhydride, cyclohexane dicarboxylic acid anhydride and succinic acid. These modifications provide sufficient chemical functionality which permit high molecular weight development for thickening reactions with metal oxides to form the SMC, viscosity reduction during anhydride such as, but not limited to, maleic anhydride forming maleate half-esters.

Besides the triglyceride monomers, a polymerizable monovinyl compound is also included in the formulation. Examples of such monovinyl compounds are styrene, methyl styrene, divinyl benzene, methyl methacrylate, etc. The amount of monovinyl compound can range generally from 10 percent by weight to 75 percent by weight of the triglyceride monomer weight, depending on the mechanical and thermal properties required or specified for the final end-use part. In the following examples, the resins were diluted with styrene to make 66% nonvolatile solution. Therefore, up to about 50% of the plant oil or modified plant oil based on the total weight of all components in the final resins can be used, most preferably between about 38 wt % to about 50 wt % of modified plant oil is used in the process, these modified plant oil can be epoxideized or hydroxylated plant oil.

These resins are similar to petroleum-based unsaturated polyesters, or vinyl esters, which have hydroxy or carboxylic acid groups, or both, which are used to increase resin viscosity before curing (maturation). The thickening agents can be, but are not limited to, magnesium oxide, magnesium hydroxide, calcium oxide, polyaromatic polydiisocyanate, and tolylene diisocyanate. The process can be controlled by adjusting the reactive functionalities and the amount of thickeners.

TABLE 2

SHEET MOLDING COMPOUNDIMAL

| Component | Optimal Weight Percentages | Comments |
|---|---|---|
| Styrene | about 5 to about 14% | improves property control |
| Soy Resin | about 10 to about 12% | Mixtures from FIG. 1 |
| Styrene/Soy Ratio | about 0:1–1:1 | Should be optimized |
| Glass fiber | 25–35 | Glass or Natural fibers |
| Glass Fiber Sizing | — | Optimized for soy resins |
| Natural Fibers | 0–about 35% | preferably Jute, Flax, Kenaf, Straw or Wood |
| Natural Fiber sizing | — | Optimized for Soy resin |
| Calcium Carbonate, Lignin | about 35 to about 45% | Examples of filler materials |
| Low Profile Additive | about 3 to about 4% | Prevents shrinkage by cavitation |
| Initiator | up to about 1% | Used for final cure |
| Divalent Cation | about 0.5–1.0 | Used for B-Stage thickening |
| Zinc Stearate | up to about 1% | Used for mold release |
| Other Additives | 0 to about 10% | tougheners, stabilizers, colorants, etc. |

The above plant-based resins and their blends are curable via any addition type polymerization mechanism. Polymerization can be accomplished by radiation such as, but not limited to, photon, electron beams (e-beam), heat or free radical polymerization. The most favorable being free radical polymerization. Free radical polymerization requires that an initiator be added to the compound in initiate final cure in the mold. Initiator compounds such as, but not limited to, peroxides such as, but not limited to, benzyl peroxide, methyl ethyl ketone peroxide, hydrogen peroxide, and cumene hydroperoxide can be used as free radical initiators. In the preferred embodiment, both tert-butyl peroxybenzoate (TBP) and methyl ethyl ketone peroxide (EKP) were used as the free radical initiators.

Accelerators and inhibitors are added to control the rate of polymerization as well as the required molding temperatures. Examples of accelerators are cobalt naphthenate and cobalt octoate. Examples of suitable inhibitors are quinones such as, but not limited to, hydroquinone, p-benzoquinone and toluquinone.

The molding compound may also contain reinforcing fibers, fillers, and additives, as shown in Table 2. These are added so as to reduce cost, improve mechanical properties, or facilitate processing of the compound. Many reinforcing fibers can be used such as chopped glass fiber, chopped carbon fiber, as well as natural fibers such as flax, jute, straw, kenaf, hemp, etc. Chopped glass fiber is the most popular reinforcing fiber. Dimensions of the fiber as well as necessary sizing are known to those skilled in the art.

Fillers also can be added. Filler include but are not limited to calcium carbonate, chalk, limestone, silicate, aluminum trihydrate, and talc. Fillers can help improve mechanical properties and/or reduce the overall cost of the molding compound.

Other optional ingredients include additives, such as mold release agents, many of which as mentioned previously are fatty acid salts, or low profile thermoplastic additives (LPA), which reduce shrinkage during polymerization. These additives can also be incorporated into the molding compound.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described. The examples illustrate representative products and are given by way of illustration only and are not to be considered as being limiting.

All the references described above are incorporated by reference in their entireties for all useful purposes.

EXAMPLES

In the following samples, a Brookfield DV-I+ viscometer was used to measure the viscosity of the pure resins and the thickening behavior. The T-bar spindles were used for the high viscosity and HB spindles were used for the low viscosity. All measurement were done at room temperature. For the dynamic mechanical analysis (DMA) samples, the finished resin was diluted with styrene, 0.2 phr (parts per hundred) of tert-butyl peroxybenzoate (TBP), the solution was degassed and poured into a rubber gasket sandwiched between two metal plates covered with aluminum foil. Samples were cured at 100° C. for two hours, and post-cured at 150° C. for 1.5 hours. The exception is the high epoxidized plant oil products, 1.5 phr of methyl ethyl ketone peroxide (MEKP) was used, and samples were cured at 90° C. for two hours, and post-cured at 150° C. for 2 hours. Samples were then polished to dimensions of approximately 9×56×2 mm. The glass transition temperature was defined as the temperature where the loss modulus shows a maximum in value. For the flexural test samples, they followed the same curing cycle as DMA samples, and they were measured using ASTM method D790-95a. For the tensile test, resins were cured in the dogbone mold at 90° C. for 2 hours, 100° C. for 4 hours, and post-cured at 150° C. for 1.5 hours. Tensile strength, modulus and elongation were measured using ASTM method D638. The hardness was measured using ASTM method D2240-97$^{e1}$. The water absorption was measured using ASTM method D570-98.

Preparation of Plant Oil Resins

Example 1

Hydroxylated Plant Oil (HPO)

1000 ml of plant triglyceride was mixed with 1000 ml of 97% formic acid, 550 ml 30% $H_2O_2$, ice-water bath is required to keep temperature below 45° C. The reaction was vigorously stirred overnight. The emulsion was poured into a separator funnel and extracted with ether. The water layer was discarded, and the ether layer was washed with water, dilute sodium bicarbonate solution, and saturate sodium chloride solution, respectively. The resulting ether solution was dried over magnesium sulfate, and the ether was removed by a rotary evaporator. The resulting product is a hydroxylated plant oil (HPO).

Example 2

Maleinated Hydroxylated Plant Oil (MAHPO)

400 g of hydroxylated triglyceride (HPO) and 0.2 g of hydroquinone were added in a 1 L round-bottom flask. 144.4 g of maleic anhydride (MA) was added when the mixture was warmed to 60° C. under stirring. The temperature was further raised to 80° C. and 15 ml of benzyldimethylamine was added in two portions. The reaction was kept at 80° C. for 5 hr. under stirring to obtain the maleinized product with a 4:1 molar ratio of MA to hydroxylated triglyceride. The resulting product was a maleinated plant oil (MAHPO). The mixture was cooled to about 50° C. and blended with 50% wt styrene. Properties of this resin are given in Table 3.

Example 3

Partially Acrylated Epoxidized Plant Oil (p-AEPO)

100 g of epoxidized triglyceride (G-62 Paraplex from C. P. Hall Co.) having an average of 4.2 epoxy groups per triglyceride and an iodine number of 5, was mixed with 23 g of acrylic acid, after which 0.2 g of hydroquinone and 10 drops of 30% benzyltrimethyl ammonium hydroxide solution in methanol were added. The mixture was heated and stirred at 110° C. for 12 hours or until spectroscopic examination showed the disappearance of the desired amount of the epoxy groups.

Example 4

Maleinized AEPO (Map-AEPO) Resin 80 g of the partially acrylated epoxidized triglycerides (p-AEPO) prepared from Example 3, having approximately 8% of the epoxy groups unreacted, was mixed with 10 g of maleic acid and heated to 80° C. for 2 hours. The mixture was poured out and cooled down in the range 40–50° C., then it was mixed with 50% wt styrene. The resulting resin properties are given in Table 3.

Example 5

Maleinized APO (MAPO)

400 g of a fully acrylated plant oil (APO) containing 3.4 acrylates per triglyceride and 0.2 g of hydroquinone were added in a 1 L round-bottom flask. When the mixture was warmed to 60° C., 65 g of maleic anhydride (MA) was added while stirring. The temperature was raised to 80° C. and 15 ml of benzyldimethylamine catalyst was added in two portions. The reaction was kept at 80° C. for 3 hr to obtain the maleinized product (MAPO-2/1) with a 2:1 molar ratio of MA to acrylated triglyceride. The mixture was poured out and cooled to 40–50° C., then mixed with 50% wt of styrene. The properties of this resin are given in Table 3.

Example 6

MAPO-3/1

400 g of a fully acrylated plant oil (APO) and 0.2 g of hydroquinone were added in a 1 L round-bottom flask. When the mixture was warmed to 60° C., 65 g of maleic anhydride (MA) was added while stirring. The temperature was further raised to 80° C. and 15 ml of benzyldimethylamine was added in two portions. The reaction was kept at 80° C. for 3 hr to obtain the maleinized product (MAPO-3/1) with a 3:1 molar ratio of MA to acrylated epoxidized triglyceride. The mixture was poured out and cooled to 40–50° C., then mixed with 50% wt of styrene. The resin properties are given in Table 3.

TABLE 3

|  | Example 2 | Example 4 | Example 5 | Example 6 |
|---|---|---|---|---|
| Viscosity, cP | 1376 | 1140 | 796 | 980 |
| Hardness | 80 | 80 | 84 | 86 |
| Tensile Strength, psi |  | 6380 | 5984 | 6391 |
| Tensile Modulus, ksi |  |  | 316 | 358 |
| Elongation, % |  |  | 5.18 | 3.95 |
| Flexural Strength, psi | 8906 | 10947 | 11181 | 12650 |
| Flexural Modulus, ksi | 356 | 355 | 377 | 440 |
| Glass Transition Temperature, ° C. | 104 | 105 | 114 | 130 |
| % Water Absorbed in 2 d Water Boil | 2.02 |  | 1.08 | 1.23 |
| % Soluble Matter Lost in 2 d Water Boil | None |  | None | None |
| % Water Absorbed in 24-hour immersion | 0.25 |  | 0.26 | 0.30 |

Example 7

(PAPO)

30 g of a fully acrylated plant oil (APO) was mixed with 7.4 g of phthalic anhydride (PA), and 0.03 g of hydroquinone. The mixture was heated to 140° C., until the PA was melted and 0.6 g of benzyldimethylamine was added. The mixture was kept at 140° C. for 1.5 hr, then poured out in a beaker. When the product (PAPO) cooled down to 50° C., 50 wt % of styrene was added. This resin was not fully evaluated, but when it was cured, it produced a rigid solid with a Tg of about 80° C. and storage modulus of about 2 GPa.

Example 8

Fully Acrylated High Epoxidized Plant Oil (HAEPO)

70 g of high epoxidized triglycerides (VIKOFLEX 7190 from Atofina Chemical Inc.) having an average of 6.2 epoxy groups per triglyceride, was mixed with 0.21 g of hydroquinone and 0.14 g of the catalyst AMC-2 (50% C-7,9, 11 Phthalate Esters, 50% Trivalent Organic Chromium Complex) (Aerojet Chemical), the mixture was vigorously stirred and heated to 70° C. Once the reaction reached 70° C., 7 g of acrylic acid was added to the reaction, this amount corresponded to an addition of approximately 1.1 mole acrylic acid per mole triglyceride. 30 minutes after the first addition of acrylic acid, another 7 g of acrylic acid was added. 30 minutes after the second addition, another 7 g of acrylic acid was added; 1.5 hrs later, the forth portion was added; last 7 g of acrylic acid was added to the reaction 1.5 hrs after the forth addition. The reaction was kept at 70° C. for 9 hours. The epoxy groups were completely consumed and about 5.7~5.8 acrylate functionalities were added on the triglycerides.

Example 9

Maleinized HAEPO 80 g of fully acrylated high epoxidized plant oil (HAEPO) prepared from Example 8, was mixed with 11.3 g of maleic anhydride and 0.08 g of hydroquinone, the mixture was heated to 80° C. and 1.6 g of benzyldimethylamine catalyst was added in two portions. The reaction was kept at 80° C. for 1.5 hrs and poured out before it got gelled. When it was cooled to 40–50° C., 50 wt % of styrene was added. The viscosity of the resulting resin ranged from 824 to 1750 cps. 1.5 phr methyl ethyl ketone peroxide was used as initiator for curing. Dynamic mechanical test showed a storage modulus 2.41 GPa and Tg 124° C. The 3-point bending test showed a flexural strength 95.64 MPa and modulus 2.78 GPa.

Example 10

Maleinized Plant Oil Blends 17 g of HAEPO prepared from Example 8 and 15 g of p-AEPO prepared from Example 3 were mixed with 4.94 g of maleic anhydride and 0.03 g of hydroquinone, the mixture was heated to 80° C., 0.65 g of benzyldimethylamine was added. The mixture was kept for 2 hrs at 80° C. It was poured out and 50 wt % of styrene was added. This resin had a storage modulus 2.35 GPa and Tg=125° C.

Preparation of Plant-Based Thickened Resin

Example 11

Thickened MAHPO 150 g of resin (MAHPO) from Example 2 was mixed with 5.92 g of MgO dispersion (38% MgO dispersed in polyester) and 0.75 g hydroquinone and stored at the room temperature. The viscosity of the blend was observed periodically. The data of viscosity as a function of time are tabulated below:

| Hours after addition of MgO | Viscosity (cP) |
|---|---|
| 1 | $1.5 \times 10^3$ |
| 7 | $4.6 \times 10^4$ |
| 19 | $8.6 \times 10^5$ |
| 24 | $1.13 \times 10^6$ |
| 48 | $3.3 \times 10^6$ |
| 72 | $3.8 \times 10^6$ |
| 96 | $4.4 \times 10^6$ |
| 120 | $4.9 \times 10^6$ |
| 168 | $5.0 \times 10^6$ |
| 192 | $4.9 \times 10^6$ |

This example shows the thickened soyoil resin can reach a moldable viscosity and final plateau value.

Example 12

Thickened MAPO-21

150 g of resin prepared from Example 5 (MAPO-2/1) was mixed with 5.92 g of MgO dispersion and 0.75 g of hydroquinone, then the mixture was stored at the room temperature. The data of viscosity as a function of time are tabulated below

| Hours after addition of MgO | Viscosity (cP) |
|---|---|
| 1 | $1.5 \times 10^3$ |
| 7 | $2.0 \times 10^4$ |
| 19 | $3.2 \times 10^5$ |
| 24 | $5.3 \times 10^6$ |
| 48 | $3.1 \times 10^6$ |
| 72 | $4.5 \times 10^6$ |
| 96 | $9.9 \times 10^6$ |
| 120 | $1.3 \times 10^7$ |
| 168 | $1.4 \times 10^7$ |
| 192 | $1.6 \times 10^7$ |

This example shows it took more time than the resin in Example 8 to reach a stable viscosity, but the final viscosity is higher than that in Example 8.

Example 13

Thickened MAPO-3/1

150 g of the resin (MAPO-3/1) prepared from Example 6 was mixed with 0.75 g of hydroquinone and was treated with varying weight percentage of MgO dispersion at room temperature to test the thickening behavior. The viscosities appear below:

| Time after addition of MgO dispersion (hrs) | Viscosity | | | |
|---|---|---|---|---|
| | 1.0% MgO | 1.5% MgO | 2.0% MgO | 2.5% MgO |
| 1 | 1104 | 1168 | 1272 | 1280 |
| 5 | 1565 | 1768 | 2912 | 4475 |
| 9 | 2276 | 3352 | 8974 | 26568 |
| 27 | 9797 | 45848 | 301000 | $1.64 \times 10^6$ |
| 48 | $2.31 \times 10^4$ | $1.87 \times 10^5$ | $1.58 \times 10^6$ | $9.76 \times 10^6$ |
| 72 | $3.63 \times 10^4$ | $4.51 \times 10^5$ | $3.53 \times 10^6$ | $2.45 \times 10^7$ |
| 96 | $4.71 \times 10^4$ | $7.88 \times 10^5$ | $7.45 \times 10^6$ | $4.96 \times 10^7$ |
| 120 | $5.53 \times 10^4$ | $1.18 \times 10^5$ | $1.45 \times 10^6$ | $6.88 \times 10^7$ |
| 148 | $5.75 \times 10^4$ | $1.57 \times 10^6$ | $1.68 \times 10^7$ | $7.92 \times 10^7$ |
| 173 | $6.90 \times 10^4$ | $2.01 \times 10^6$ | $1.90 \times 10^7$ | $9.50 \times 10^7$ |
| 293 | $8.296 \times 10^4$ | $3.60 \times 10^6$ | $2.50 \times 10^7$ | $1.05 \times 10^8$ |

This example shows the control over ultimate viscosity with a change in MgO addition as the long term stability of the maturated compounds.

Example 14

Thickened PAPO 7.5 g of resin (PAPO) prepared from Example 7, was mixed with 0.4 g of MgO dispersion and 0.04 g of hydroquinone. After two days, it was stiffened and tack free.

Example 15

Thickened Maleinized HAEPO 150 g of resin prepared from Example 9 was mixed with 5.92 g of MgO dispersion and 0.75 g of hydroquinone, then the mixture was stored at the room temperature. The data of viscosity as a function of time are tabulated below

| Hours after addition of MgO | Viscosity (cP) |
|---|---|
| 0.25 | $3.95 \times 10^3$ |
| 0.5 | $3.44 \times 10^4$ |
| 0.75 | $6.96 \times 10^5$ |
| 1.00 | $2.90 \times 10^6$ |
| 7.0 | $1.71 \times 10^7$ |
| 19 | $1.79 \times 10^7$ |
| 24 | $2.52 \times 10^7$ |

-continued

| Hours after addition of MgO | Viscosity (cP) |
|---|---|
| 48 | $2.25 \times 10^7$ |
| 72 | $5.52 \times 10^7$ |
| 96 | $7.30 \times 10^7$ |

This example shows this resin can be quickly thickened, it could reach the moldable viscosity less than one day.

Example 16

PAPI-APO 10 g of fully acrylated plant oil (APO) combined with 5 g of styrene, was treated with different amounts of polyaromatic Polyisocyanate (PAPI), it was found that when the PAPI used was more than 7.25 % wt of total resin, it can be thickened.

Example 17

TDI-APO 10 g of fully acrylated plant oil (APO) was mixed with 5 g of styrene. When it was thickened by Tolylene Diisocyanate (TDI), it was found a molar ratio of 0.42 isocyanate/hydroxy was necessary to form a non-tacky sheet.

Thickened Resin Molding Behavior

Example 18

For successful SMC manufacturing, an important component of the high-viscosity thickened resin behavior is thermoreversibility, i.e., that it has the ability to substantially reduce its viscosity and flow when heated. The thickened resins from Example 8 (MAHPO) and Example 9 (MAPO-2/1) were put in 150° C. silicon oil bath. The viscosity and temperature changing with time were measured and tabulated below.

| | | Viscosity (cP) | |
|---|---|---|---|
| Heating time (mins) | Temperature (° C.) | MAHPO | MAPO-2/1 |
| 0 | 21 | $4.90 \times 10^6$ | $1.6 \times 10^7$ |
| 5 | 70 | $2.01 \times 10^6$ | $3.88 \times 10^6$ |
| 7 | 75 | $6.52 \times 10^5$ | $1.00 \times 10^6$ |
| 8 | 80 | $4.01 \times 10^5$ | $9.80 \times 10^5$ |
| 9 | 85 | $1.96 \times 10^5$ | $2.98 \times 10^5$ |
| 10 | 90 | $7.36 \times 10^4$ | $5.60 \times 10^4$ |
| 11 | 95 | $4.48 \times 10^4$ | $3.20 \times 10^4$ |
| 12 | 95 | $1.02 \times 10^4$ | $1.60 \times 10^4$ |
| 13 | 100 | $3.84 \times 10^3$ | $2.80 \times 10^3$ |

The thickened resins were found to be thermoreversible, since the viscosity decreased by several orders of magnitude as the temperature was raised from room temperature to 100° C. The reduction of viscosity is very useful to get good mold flow of the SMC paste.

Preparation of SMC Paste

Example 19

60 g of resin (MAPO-2/1) prepared from Example 6, was mixed with 0.05 g of hydroquinone, 1.19 g of tert-butyl peroxylbenzoate, 3.95 g of MgO dispersion, 2.4 g of zinc stearate, and 60 g of calcium carbonate. The mixture was cast between two layers of kapton film. A non-tacky SMC sheet was formed after two days.

Example 20

107 g of the resin (MAHPO) prepared from Example 2, was combined with 0.02 g of p-benzoquinone, 6 g of t-butyl peroxybenzoate, 10 g of zinc stearate, and 403 g of calcium carbonate. A separate mixture of 10 g of styrene, 5 g of magnesium oxide and 30 g of calcium carbonate was made. The two mixtures were blended and cast between two layers of kapton film. This film was cured at 65° C. for up to 1.5 hours to produce the B-stage sheet. The sheet was then post cured in a compression mold at 125° C. for up to 1.5 hours producing a shaped rigid solid composite.

Example 21

350 g of the resin (Map-AEPO) prepared from Example 5 were mixed with 0.1 g of p-benzoquinone, 14 g of t-butyl peroxybenzoate, 45 g of zinc stearate, 1014 g of calcium carbonate. This mixture was cast between two kapton films. The film was cured at 65° C. for up to 1.5 hours, producing a B-Staged SMC. The SMC was cured in a Compression mold at 125° C. for up to 1.5 hours producing a rigid solid.

We claim:

1. A process to produce a molded compound which comprises
   (1) mixing
   an unsaturated polymer resin which has been synthesized from a natural triglyceride oil containing an effective amount of acid groups in order to thicken with metal ions,
   a polymerizable monomer,
   a thickening agent which contains metal ions to form a polymerizable material,
   (2) polymerizing said polymerizable material in a mold to form a molded compound.

2. The process as claimed in clam 1, wherein the polymerization is initiated with an initiator.

3. The process as claimed in claim 1, wherein the mixing step further requires
   (D) at least one reinforcing filler or fiber or
   (E) at least one internal mold release agent or
   a mixture of said (D) and said (E).

4. The process as claimed in claim 1, wherein said polymerizable monomer is a compound having at least one unsaturated double bond in the molecule.

5. The process as claimed in claim 1, wherein said polymerizable monomer is monovinyl compound.

6. The process as claimed in claim 5, wherein monovinyl compound is styrene, methyl styrene or methyl methacrylate.

7. The process as claimed in claim 5, wherein said polymerizable monomer is styrene.

8. The process as claimed in claim 5, wherein amount of monovinyl compound is from about 10 percent by weight to about 75 percent by weight of the triglyceride.

9. The process as claimed in claim 2, wherein said initiator is t-butyl peroxybenzoate or methyl ethyl ketone peroxide.

10. The process as claimed in claim 1, wherein the polymerizing step further requires an inhibitor or an accelerator or a mixture thereof.

11. The process as claimed in claim 10, wherein said inhibitor is quinone.

12. The process as claimed in claim 10, wherein said inhibitor is hydroquinone, p-benzoquinone or toluquinone.

13. The process as claimed in claim 10, wherein said inhibitor is hydroquinone.

14. The process as claimed in claim 10, wherein said accelerator is cobalt naphthenate or cobalt octoate.

15. The process as claimed in claim 1, wherein said thickening agent is magnesium oxide, magnesium hydroxide, or calcium oxide.

16. The process as claimed in claim 2, wherein said thickening agent is magnesium oxide.

17. The process as claimed in claim 1, wherein said triglyceride oil is chosen from soybean oil, linseed oil, rapeseed oil, cottonseed oil, corn oil, palm oil, fish oil, canola oil, sunflower oil, safflower oil or peanut oil.

18. The process as claimed in claim 3, wherein said mold release agent is zinc stearate.

19. The process as claimed in claim 1, wherein said polymerizing is accomplished by photon radiation, electron beam radiation, gamma radiation, heat or free radical polymerization.

20. The process as claimed in claim 2, wherein said polymerizing is accomplished by free radical polymerization and said initiator is added to the compound to initiate final cure in the mold and said initiator is a peroxide.

21. The process as claimed in claim 20, wherein said peroxide is benzyl peroxide, methyl ethyl ketone peroxide, hydrogen peroxide or cumene peroxide.

22. The process as claimed in claim 3, wherein said at least one reinforcing filler or fiber is chopped glass fiber, chopped carbon fiber, flax, jute, straw, kenaf, hemp, calcium carbonate, chalk, limestone, silicate, aluminum trihydrate or talc.

23. The process as claimed in claim 1, wherein said the molar ratio of reactant anhydride to triglyceride oil of 2:1 up to 4:1.

24. The process as claimed in claim 1, wherein said the molar ratio of reactant anhydride to triglyceride oil of 2:1 up to 3:1.

25. The process as claimed in claim 1, wherein the molding compound is a sheet molding compound.

26. The process as claimed in claim 1, wherein said unsaturated polymer is a polyester resin which has been synthesized from triglyceride oil.

27. The process as claimed in claim 1, wherein said polymerizable monomer is a compound having at least two unsaturated double bond in the molecule.

28. The process as claimed in claim 8, wherein said monovinyl compound is styrene.

29. A process to produce a molded compound which comprises
(1) mixing
an unsaturated polymer resin which has been synthesized from a natural triglyceride oil containing an effective amount of acid groups in order to thicken with metal ions or divalent monomers, and
a zinc stearate mold release agent
a polymerizable monomer,
a thickening agent to form a polymerizable material,
(2) polymerizing said polymerizable: material in a mold to form a molded compound.

30. A molded article prepared by the process of claim 1.

31. A molded composition which consists essentially of
an unsaturated polyester resin based which has been synthesized from a natural triglyceride oil containing an effective amount of acid groups in order to thicken with metal ions,
a polymerizable monomer and
a thickening agent which contains metal ions.

32. The composition as claimed in claim 31, which further contains an initiator.

33. The composition as claimed in claim 32, which further contains
at least one reinforcing filler or fiber and/or
at least one internal mold release agent.

34. The composition as claimed in claim 32, wherein the polymerizable monomer is styrene.

35. The composition as claimed in claim 32, wherein said initiator is t-butyl peroxybenzoate or methyl ethyl ketone peroxide.

36. The composition as claimed in claim 31, which further contains an inhibitor or an accelerator or a mixture thereof.

37. The composition as claimed in claim 36, which contains said accelerator and wherein said accelerator is cobalt naphthenate or cobalt octoate.

38. The composition as claimed in claim 36, which contains said inhibitor and wherein said inhibitor is p-benzoquinone or hydroquinone.

39. The composition as claimed in claim 31, wherein said thickening agent is magnesium oxide.

40. The composition as claimed in claim 33, wherein said mold release agent is zinc stearate.

41. The composition as claimed in claim 31, wherein said unsaturated polyester resin contains no petroleum derived raw materials.

\* \* \* \* \*